United States Patent [19]

Harm et al.

[11] Patent Number: 5,014,933

[45] Date of Patent: May 14, 1991

[54] TRANSLATING LIP AIRCRAFT COWLING STRUCTURE ADAPTED FOR NOISE REDUCTION

[75] Inventors: Dorson J. Harm, Seattle; Joseph M. Zabinsky, Bellevue, both of Wash.

[73] Assignee: The Boeing Company, Seattle, Wash.

[21] Appl. No.: 343,729

[22] Filed: Apr. 27, 1989

[51] Int. Cl.$^5$ .............................................. B64D 33/02
[52] U.S. Cl. ............................... 244/53 B; 244/53 R; 181/215; 181/220
[58] Field of Search ............... 244/1 N, 53 R, 53 B, 244/130; 137/15.1, 15.2; 181/215, 216, 219, 220, 214

[56] References Cited

U.S. PATENT DOCUMENTS

| | | | |
|---|---|---|---|
| 2,474,068 | 6/1949 | Sammons et al. | 230/132 |
| 2,636,666 | 4/1953 | Lombard | 230/132 |
| 3,532,129 | 10/1970 | Ward et al. | 138/45 |
| 3,575,259 | 4/1971 | Wilkinson | 181/35 |
| 3,660,981 | 5/1972 | Stevens | 244/53 R X |
| 3,662,556 | 5/1972 | Poucher et al. | 181/214 X |
| 3,664,612 | 5/1972 | Skidmore et al. | 244/53 B |
| 3,750,689 | 8/1973 | Britt | 137/15.1 |
| 3,820,628 | 6/1974 | Hanson | 181/33 |
| 3,883,095 | 5/1975 | Fletcher et al. | 244/53 B |
| 3,981,466 | 9/1975 | Shah | 244/134 |
| 4,023,644 | 5/1977 | Cowan et al. | 244/53 B X |
| 4,047,911 | 9/1977 | Krojer | 55/306 |
| 4,132,240 | 1/1979 | Frantz | 244/53 B X |
| 4,154,256 | 5/1979 | Miller | 244/53 B X |
| 4,240,250 | 12/1980 | Harris | 60/39 |
| 4,749,151 | 6/1988 | Ball et al. | 244/53 B |
| 4,865,268 | 9/1989 | Tracksdorf | 244/53 B |
| 4,917,336 | 4/1990 | Jacobs et al. | 244/130 X |
| 4,934,481 | 6/1990 | Friedrich | 181/215 |

FOREIGN PATENT DOCUMENTS 489594  7/1938  United Kingdom ............. 244/53 R

*Primary Examiner*—Joseph F. Peters, Jr.
*Assistant Examiner*—James M. Kannofsky
*Attorney, Agent, or Firm*—Dellett, Smith-Hill & Bedell

[57] ABSTRACT

The present invention comprises a cowling structure for a gas turbine aircraft engine which allows the aerodynamic characteristics of the inlet passageway to the engine to be varied in accordance with flight conditions. This structure includes an annular lip portion positioned at the front edge of the cowling defining an aerodynamically sharp contour and which is mounted on a set of support struts constructed for allowing the lip portion to be translated forwardly and backwardly from the forward edge of the cowling. The structure further comprises a mechanism for injecting pressurized air into the airflow along the trailing edges of these support struts in order to suppress turbulence induced in tha airflow such that noise as may be produced as a result of airflow is substantially decreased.

13 Claims, 5 Drawing Sheets

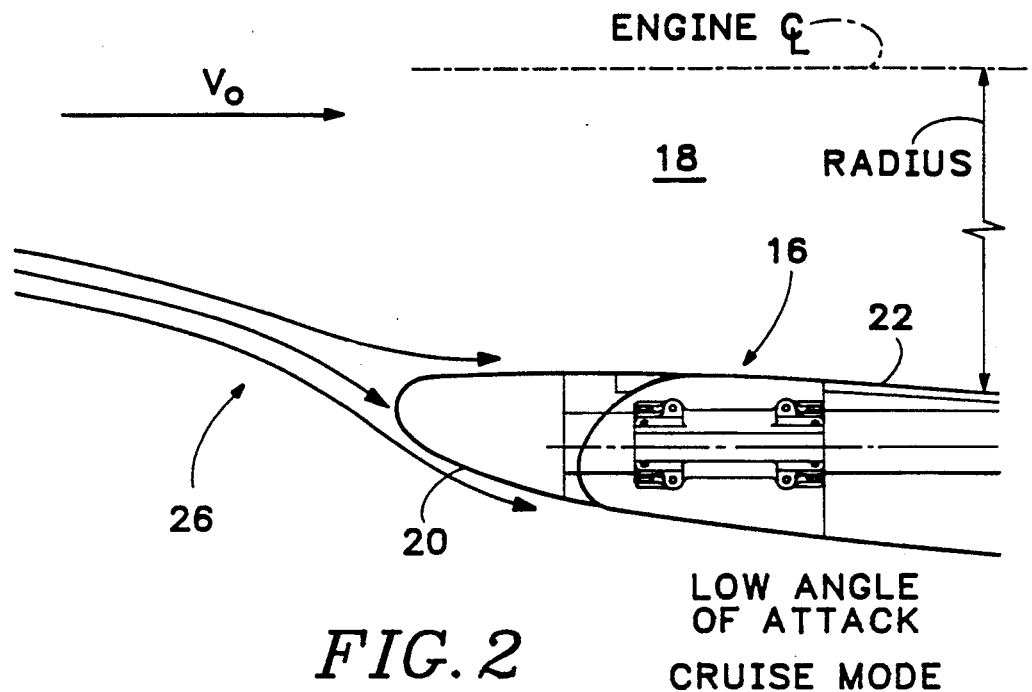
FIG. 2 — LOW ANGLE OF ATTACK CRUISE MODE
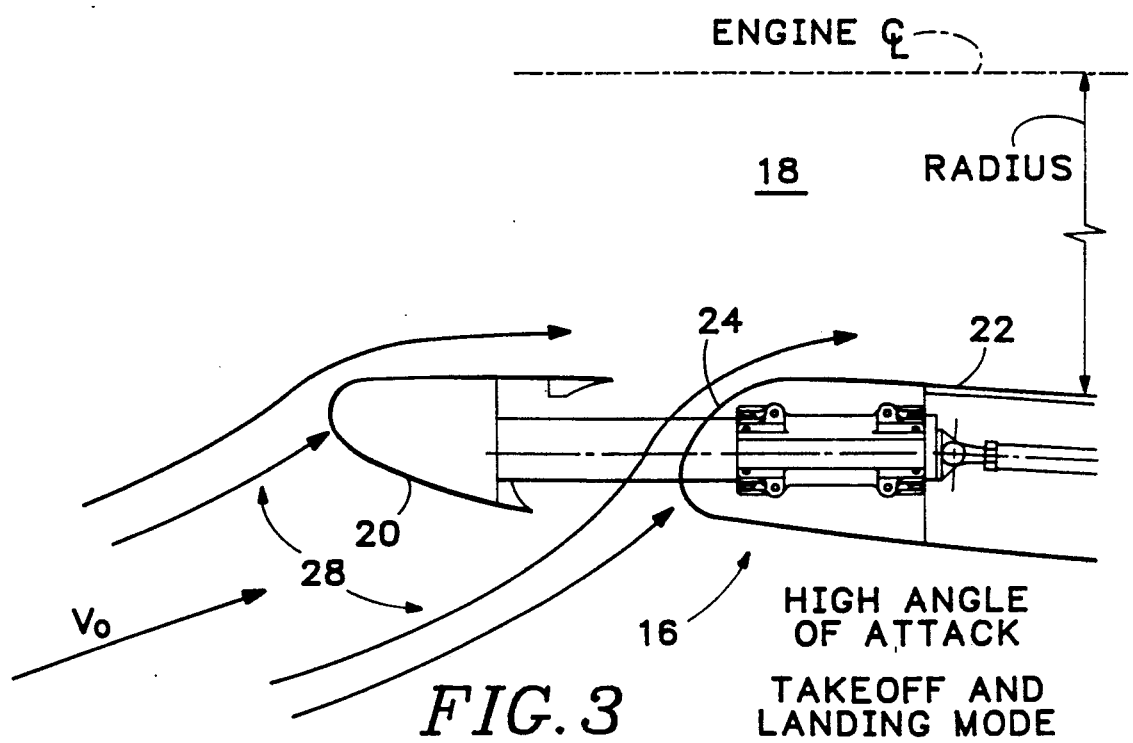
FIG. 3 — HIGH ANGLE OF ATTACK TAKEOFF AND LANDING MODE

TRANSLATING LIP AIRCRAFT COWLING STRUCTURE ADAPTED FOR NOISE REDUCTION

The present invention relates to aircraft gas turbine engines and more specifically to the cowling structures of such engines which define the air inlet passageways.

BACKGROUND OF THE INVENTION

The geometry of the inlet structure and more particularly the shape of the cowling which defines the inlet passageway into an aircraft gas turbine engine has important effects on engine performance. As flight conditions for the aircraft vary, the character of the airflow approaching and entering the engine will change. To accommodate this variation, it is beneficial to vary the geometry of the inlet and the shape of the cowling. More particularly, at cruising speeds a cowling having a sharp aerodynamic surface helps to minimize drag and promote efficient airflow in and around the engine. This is especially true at high subsonic cruising speeds above mach 0.85 at which a contraction ratio (ratio between the area of the highlight cross section and the area at the throat of the inlet) of approximately 1.1 is necessary for performance. However, at slower speeds and higher angles of attack, the cowling defining the intake passageway should present a more blunt aerodynamic contour to the incoming airflow in order to prevent distortion of the airflow resulting in the formation of eddies when the air passes by the cowling structure as can seriously degrade engine performance. This tends to be true during takeoff and landing as high angles of attack are normal during these maneuvers and therefore a contraction ratio of approximately 1.25 or greater is considered necessary.

In the past, these problems have been addressed through the use of structures which define variable inlet geometries for aircraft gas turbine engines by changing the aerodynamic characteristics of the cowling surrounding the intake passageway in accordance with flight conditions. These structures have commonly comprised annular lips mounted on rails that may be translated forwardly from the cowling structure to allow a more blunt aerodynamic contour to be presented to the oncoming air. Such structures have been relatively successful in avoiding airflow distortion problems. However, they have, unfortunately, also been the source of substantial noise generated as a result of the interaction between the airflow and the support rails mounting the lip. This noise is generated during takeoff and landing when the lip is deployed in its forward position, and at a time when extra noise is least desirable since it may tend to disturb the public in and around the airport which the aircraft is approaching or leaving.

It is, therefore, an object of the present invention to provide an improved system for efficiently varying the inlet geometry of the cowling defining the intake passageway of an aircraft gas turbine engine so that the aerodynamic contours of the cowling can be changed in accordance with flight conditions.

It is another object of the present invention to provide an improved structure adapted for changing the aerodynamic contour of the cowling defining the intake passageway into a gas turbine engine of an aircraft, which structure is constructed and arranged to reduce the amount of noise generated by the interaction of the structure with the airflow into and around the engine.

It is a further object of the present invention to provide an improved system for supporting operational structures for use in and around the intake passageway into an aircraft gas turbine engine, which system is adapted for noise reduction.

SUMMARY OF THE INVENTION

The present invention comprises a variable geometry aerodynamic structure for the cowling defining the intake passageway into a gas turbine aircraft engine. This structure includes an annular lip portion positioned at the front edge of the cowling having an aerodynamically sharp contour, a mechanism for axially translating this lip portion backward and forward from the front edge of the cowling, and a set of circumferentially spaced struts for mounting the lip portion. The structure further includes a mechanism for injecting pressurized air into the airflow along the trailing edge of the struts in order to suppress turbulence induced in the airflow by the struts. As such turbulence is reduced, the noise produced as a result of the airflow around the struts is substantially diminished.

In the preferred embodiment, the mechanism for injecting pressurized air into the airflow past the struts comprises passageways within the interiors of the struts and a plurality of slot-like openings in the trailing edges of the struts connecting with the passageways whereby pressurized air can be conveniently injected into the airflow. Furthermore, the pressure within the passageways in the struts is regulated in order to control the velocity with which air is injected into the airflow at the trailing edges of the struts so that the air is injected at approximately the free stream velocity of the airflow.

The present invention provides a relatively simple system for a cowling structure which allows drag to be reduced when the aircraft is cruising. The system also enables airflow distortion at the entry into the engine at high angles of attack to be avoided while at the same time the noise generated by the interaction of the cowling structure with the airflow is reduced.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 2 is an enlarged cross sectional view of the cowling of the aircraft gas turbine engine shown in FIG. 1 illustrating the airflow around the cowling in flight at low angles of attack;

FIG. 3 is an enlarged cross sectional view of the cowling of the aircraft gas turbine engine shown in FIG. 1 illustrating the airflow around the cowling in flight when it is in its extended position at high angles of attack;

DESCRIPTION OF THE PREFERRED EMBODIMENT

Figure 1:
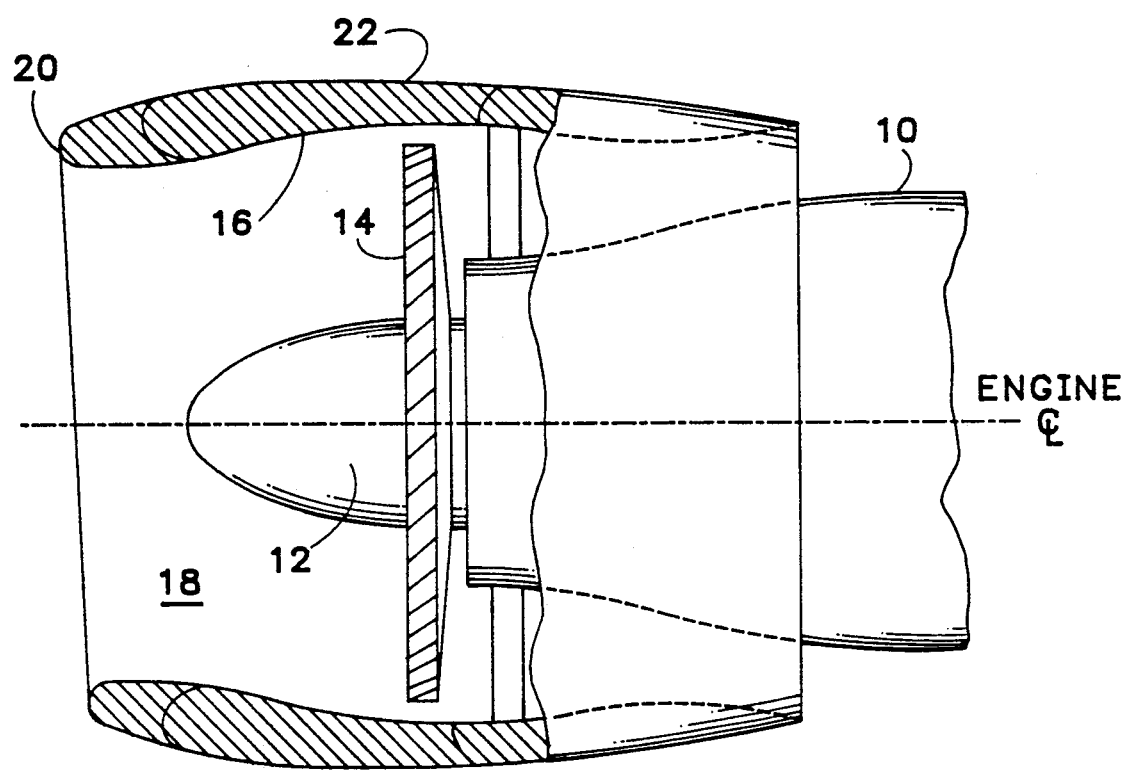
FIG. 1 is a cross sectional view through the center of an aircraft gas turbine engine on which the present invention is installed as a part of the cowling defining the intake passageway into the engine.

Referring now to FIG. 1, a typical gas turbine engine 10 is shown to include an engine fan hub 12, a fan member 14 and an outer cowling 16. The cowling 16 surrounds and peripherally defines the intake passageway 18 into the engine 10. The cowling 16 has a lip portion 20 and an aft cowling 22 on which the lip portion 20 is mounted. The lip portion 20 is translatable with respect to the aft cowling 22 as will be described later.

Referring now to FIGS. 2 and 3, these figures illustrate how the the cowling structure interacts with the airflow into the engine under different conditions as it is deployed in different positions. As shown in FIG. 2, when the aircraft is cruising, the lip portion 20 is positioned on the aft cowling 22 and the airflow proceeds smoothly around the relatively sharp contour of the lip portion 20, as indicated by the streamlines 26, without substantial distortion and with a minimum of drag. However, the sharp aerodynamic contour of the lip 20 is primarily suitable for conditions in which the aircraft is maintaining a low angle of attack. At higher angles of attack typical of lower speeds and especially of takeoff and landing maneuvers, the sharp contour of the cowling 16 defined by the lip portion 20 would cause the airflow into the engine to become distorted and break up into eddy patterns which can substantially degrade engine performance.

Therefore, the present invention is constructed and arranged to allow the sharply contoured lip portion 20 to be translated forwardly so as to be spaced apart from the aft cowling 22. As shown in FIG. 3, the airflow can then proceed around and behind the lip portion 20 as indicated by the streamlines 28 where it may interact with another cowling surface 24 located on the forward edge of the aft cowling 22. The surface 24 has a comparatively blunt aerodynamic contour which enables the airflow to proceed smoothly into the engine despite higher angles of attack. The translatable lip portion 20 allows the performance of the cowling 16 to be maximized for different types of flight conditions whereby drag may be reduced in the cruise mode and relatively undistorted flow into the engine may be assured during takeoff and landing mode.

Figure 4:
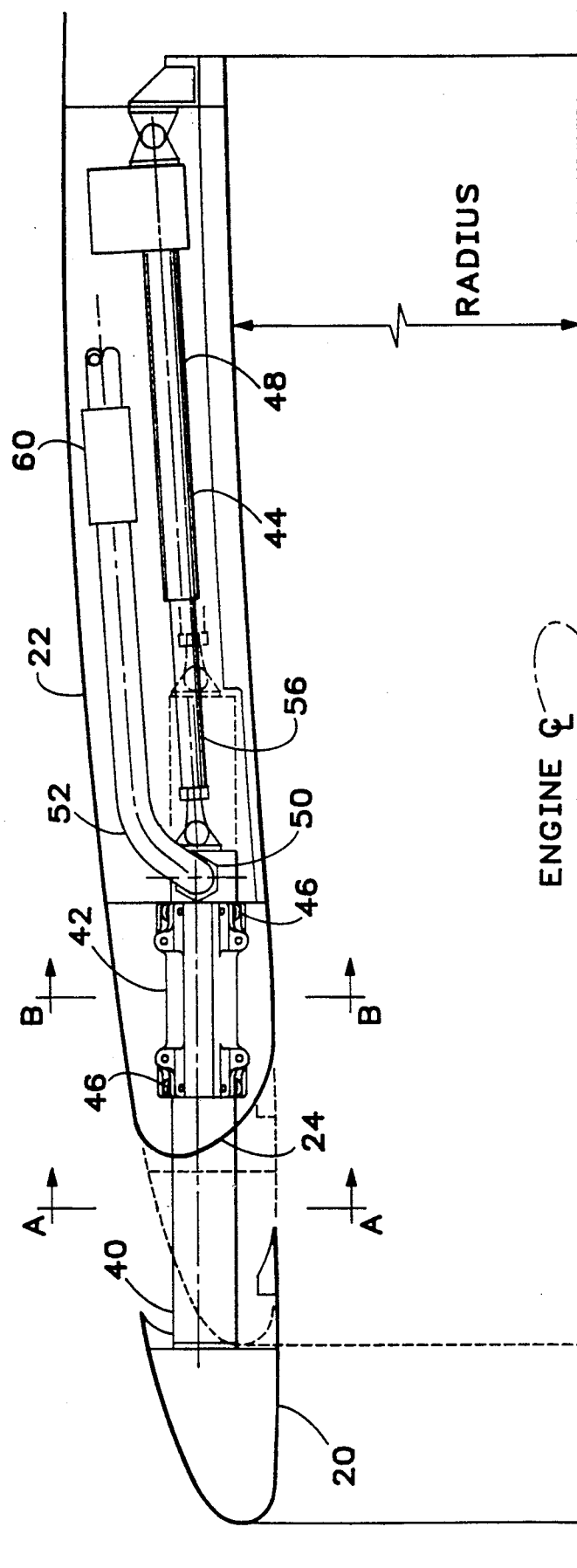
FIG. 4 is an enlarged cross sectional view of the cowling of the aircraft gas turbine engine of FIG. 1 showing the mechanical structure of the present invention as installed on the engine.

Referring now to FIG. 4, the mechanical system for operating the present invention is shown in greater detail with reference to a representative support strut 40 and associated components. The lip portion 20 is secured on guide rail or support strut 40 which is mounted within a housing 42 secured within the aft cowling 22. The housing 42 is adapted for allowing the lip portion 20 and strut 40 to be translated axially forward under the control of a double-acting actuator 44. The actuator 44 is hydraulically operated and comprises a rod 56 connected to a movable piston disposed within a cylinder 48 for being driven either forwardly or backwardly in response to hydraulic pressure. The rod 56 is connected to the strut 40 so as to translate the strut 40 within the housing 42 in accordance with the operation in the cylinder 48.

The housing 42 includes eight sets of rollers 46 in two groups of four arranged at the front and back of the housing 42 that allow the strut 40 to be accurately positioned and translated without frictional problems. The housing 42 is also provided with a pneumatic coupling 50 connecting air supply hose 52 to the rearward end of the housing 42 whereby bleed air may be supplied from the compressor stage of the engine to the housing. From within the housing 42, the air flows into and through the interiors of struts 40 as will be later described. The air supply hose 52 is connected to the compressor by way of a pressure regulator 60 for controlling the pressure and flow of the bleed-air from the compressor into struts 40. FIG. 4 shows the lip portion 20 and actuator 44 in their extended positions, while their retracted positions are indicated in phantom.

Figure 5:
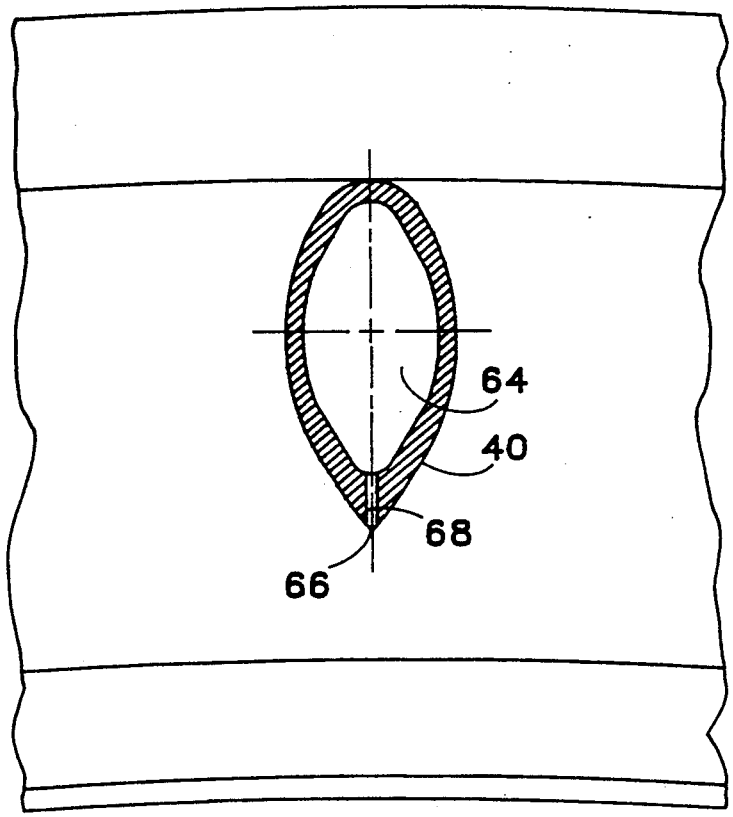
FIG. 5 is a cross sectional view along lines A—A of FIG. 4 showing the structure of the support rail or strut which is operative for mounting and translating the lip portion of the present invention.
Figure 6:
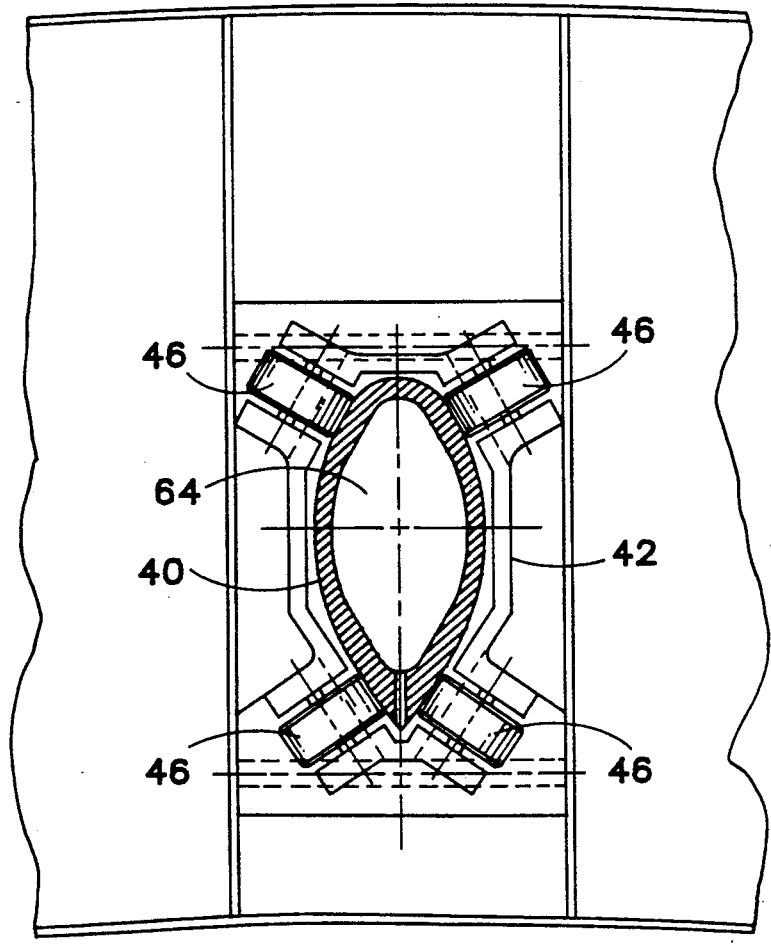
FIG. 6 is a cross sectional view along lines B—B of FIG. 4 showing the support rail or strut of FIG. 5 disposed within the housing within which it is mounted and from which it may be extended and retracted upon command.

Referring now to FIGS. 5 and 6, the structure of a representative strut 40 and a representative housing 42 mounting the same are shown in greater detail. In FIG. 5 it can be seen that the strut 40 is aerodynamically contoured for minimum drag and includes a passageway 64 extending longitudinally therewithin for connecting with the housing 42 so as to allow air to flow into the passageway 64 from supply hose 52. The strut 40 is further provided with a set of elongated slots 66 positioned in the trailing edge 68 of the strut 40 wherein these slots allow air to be injected from the passageway 64 within the interior of the strut 40 into the airflow. FIG. 6 illustrates the strut 40 mounted within the housing 42 and positioned by the rollers 46 which bear on the exterior surface of the strut 40 for maintaining its position relative to the cowling. In a typical installation, six such support struts 40 are advantageously used to support the lip portion 20 and are circumferentially spaced around the engine at the cowling 16.

Figure 7:
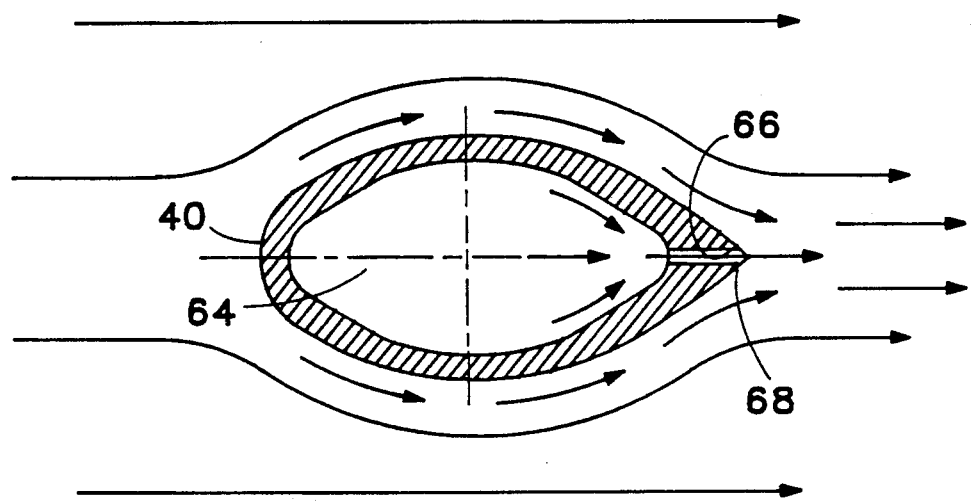
FIG. 7 is a cross-sectional view along lines A—A of FIG. 4 illustrating the interaction of a strut in accordance with the present invention with the airflow flowing past the strut into the engine.

In operation, the present invention enables the sharply contoured lip portion 20 to be extended forward during takeoff and landing modes. The blunt aerodynamic contour of the surface 24 is then presented to the airflow in order to avoid distorted airflow into the engine when the aircraft is at high angles of attack. Furthermore, the present invention addresses the problem of the disturbance of the airflow created by the struts 40 themselves as may lead to a substantial amount of noise being generated by the airflow into the engine during takeoff and landing. As illustrated in FIG. 7, showing a representative strut 40 under operational conditions, pressurized air is supplied by way of the passageway 64 within the interior of the strut 40 from where it is injected into the airflow, passing by the strut in the general direction of the engine centerline, from the slot 66 in the trailing edge 68 of the strut 40. This injected air increases the energy and velocity of the airflow in immediate proximity to the trailing edge of the strut 40 and thereby helps to reduce substantially the turbulence as would otherwise result from the airflow on different sides of the strut 40 that would be unable to recombine smoothly. The pressure of the air in passageways 64 within all of the struts 40 is controlled by the aforementioned regulator 60 so that air is injected into the airflow at approximately the free stream velocity of the flow around the struts. This velocity match enables the airflows around the struts 40 to efficiently recombine and allows an optimal reduction in the turbulence and noise generated around the struts 40.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. In a gas turbine engine for an aircraft having an air intake passageway defined by a cowling which functions for directing ambient air into said engine, a variable geometry inlet structure adapted for noise reduction, comprising:
   an annular lip positioned at the front edge of said cowling for defining an aerodynamically sharp contour along the front edge of said cowling;
   means for axially translating said lip forwardly from and backwardly to the front edge of said cowling including a set of circumferentially spaced struts for mounting said lip, said struts being exposed to airflow when they have translated said lip forwardly of the front edge of said cowling; and
   means for injecting pressurized air into the airflow along the trailing edges of said struts in order to suppress turbulence induced in said airflow by said struts and thereby reduce the noise produced as a result of the airflow past said struts.

2. The inlet structure of claim 1 wherein said means for injecting pressurized air includes a means for supplying air into the interior of said struts and a plurality of openings in the trailing edges of said struts wherein said air is injected into said airflow at approximately the free stream velocity of said airflow.

3. The inlet structure of claim 2 wherein said openings comprise elongate slots.

4. The inlet structure of claim 1 wherein said means for axially translating said lip includes a hydraulic actuator connected to said struts and attached to said cowling.

5. A method for reducing the noise generated by an aircraft gas turbine engine having an air intake passageway defined by a cowling including support struts which tend to disturb the airflow into said engine, said method including the steps of:
   supplying pressurized engine bleed air to said support struts; and
   injecting said bleed air at the trailing edges of said struts into said airflow so as to suppress turbulence in said airflow caused by said struts and reduce the noise produced by the airflow passing said struts.

6. The method of claim 5 wherein said support struts mount an axially translatable annular lip positioned at the front edge of said cowling.

7. The method of claim 5 wherein said bleed air is supplied into the interior of said struts and injected into said airflow through openings in the trailing edges of said struts at approximately the free stream velocity of said airflow.

8. The method of claim 7 wherein said openings comprise elongated slots.

9. A support structure for use in proximity to the air intake passageway of an aircraft gas turbine engine which structure is operative for reducing the noise resulting from the disturbance of the airflow into said engine caused by the presence of said structure, comprising:
   a plurality of aerodynamically contoured support struts extending across the direction of said airflow; and
   means for injecting pressurized air into said airflow at approximately the free stream velocity of said airflow through the trailing edges of said struts.

10. The structure of claim 9 wherein said means for injecting air includes:
    a plurality of passageways extending through the inside of said struts supplied with pressurized bleed air from the compressor of said engine;
    openings along the trailing edges of each of said struts which communicate with said passageways and allow said pressurized bleed air to be injected into the airflow passing said struts; and
    means for regulating the pressure of said bleed air in said passageways and the resultant velocity at which said air is injected into said airflow so as to maintain said velocity approximately equal to the free stream velocity of said airflow.

11. The structure of claim 10 wherein said openings comprise elongated slots.

12. The structure of claim 9 wherein said struts are used to support an annular lip for use in defining the peripheral contour of said passageway which is axially translatable on said struts in order to provide for variable inlet geometry.

13. The structure of claim 12 wherein said struts are axially oriented and circumferentially spaced around said air intake passageway.

* * * * *